United States Patent
Kurabayashi

(10) Patent No.: US 10,653,953 B2
(45) Date of Patent: May 19, 2020

(54) INFORMATION PROCESSING SYSTEM, PROGRAM AND SERVER FOR CARRYING OUT COMMUNICATION AMONG PLAYERS DURING A GAME

(71) Applicant: CYGAMES, INC., Tokyo (JP)

(72) Inventor: Shuichi Kurabayashi, Tokyo (JP)

(73) Assignee: CYGAMES, INC., Tokyo (JP)

( * ) Notice: Subject to any disclaimer, the term of this patent is extended or adjusted under 35 U.S.C. 154(b) by 56 days.

(21) Appl. No.: 15/900,711

(22) Filed: Feb. 20, 2018

(65) Prior Publication Data
US 2018/0169522 A1    Jun. 21, 2018

Related U.S. Application Data

(63) Continuation of application No. PCT/JP2016/071304, filed on Jul. 20, 2016.

(30) Foreign Application Priority Data

Aug. 20, 2015    (JP) .................................. 2015-163209

(51) Int. Cl.
*A63F 13/35*    (2014.01)
*A63F 13/533*    (2014.01)
(Continued)

(52) U.S. Cl.
CPC .............. *A63F 13/35* (2014.09); *A63F 13/33* (2014.09); *A63F 13/426* (2014.09); *A63F 13/533* (2014.09); *A63F 13/87* (2014.09)

(58) Field of Classification Search
CPC .......... A63F 13/30; A63F 13/33; A63F 13/35; A63F 13/87
See application file for complete search history.

(56) References Cited

U.S. PATENT DOCUMENTS 8,360,877 B2    1/2013  Matsumura
8,375,327 B2 *  2/2013  Lorch ................. G06F 3/04817
                                              715/810
(Continued)

FOREIGN PATENT DOCUMENTS

JP    2000-135378 A    5/2000
JP    2002-346230 A   12/2002
(Continued)

OTHER PUBLICATIONS

International Search Report issued in Application No. PCT/JP2016/071304, dated Sep. 13, 2016 (2 pages).
(Continued)

*Primary Examiner* — Chase E Leichliter
(74) *Attorney, Agent, or Firm* — Osha Liang LLP

(57) ABSTRACT

A player terminal displays a list including a plurality of candidate stamps and sends a stamp selected therefrom by a player to another player terminal. A stamp-metadata management unit of a server manages each of the plurality of candidate stamps in association with metadata indicating a certain situation in a game. A stamp-display-order determining unit controls the listing order for displaying the plurality of stamps on the player terminal on the basis of individual correlations between the plurality of metadata individually associated with the plurality of candidate stamps and situation data indicating a current situation in the game being executed. A metadata updating unit updates the content of the metadata for each of the plurality of candidate stamps on the basis of the result of selection of an item to send by the player.

7 Claims, 9 Drawing Sheets

(51) Int. Cl.
*A63F 13/87* (2014.01)
*A63F 13/33* (2014.01)
*A63F 13/426* (2014.01)

(56) References Cited

U.S. PATENT DOCUMENTS

| | | | | | |
|---|---|---|---|---|---|
| 8,775,526 | B2* | 7/2014 | Lorch | .................. | H04M 1/7253 455/556.1 |
| 8,808,091 | B2* | 8/2014 | Shaw | .................... | A63F 13/87 463/40 |
| 8,977,983 | B2* | 3/2015 | Park | .................... | G06F 3/0236 715/810 |
| 8,990,715 | B1* | 3/2015 | Harp | .................... | A63F 13/63 715/763 |
| 9,043,196 | B1* | 5/2015 | Leydon | .............. | G07F 17/3244 704/4 |
| 9,987,552 | B2* | 6/2018 | Lee | .................... | A63F 13/00 |
| 2006/0015560 | A1* | 1/2006 | MacAuley | .............. | A63F 13/12 709/206 |
| 2006/0025220 | A1* | 2/2006 | Macauley | .............. | A63F 13/12 463/42 |
| 2010/0184516 | A1* | 7/2010 | Matsumura | ............. | A63F 13/12 463/42 |
| 2011/0244946 | A1* | 10/2011 | Porwal | .................. | A63F 13/655 463/23 |
| 2012/0054646 | A1* | 3/2012 | Hoomani | ................ | A63F 13/79 715/758 |
| 2012/0214564 | A1* | 8/2012 | Barclay | .............. | G07F 17/3227 463/11 |
| 2015/0100537 | A1* | 4/2015 | Grieves | .................. | G06N 5/048 706/52 |
| 2015/0148130 | A1* | 5/2015 | Cibula | .................... | A63F 13/87 463/31 |
| 2016/0074751 | A1* | 3/2016 | Zhang | .................. | A63F 13/213 463/31 |
| 2016/0279523 | A1* | 9/2016 | Altagar | ................ | A63F 13/795 |

FOREIGN PATENT DOCUMENTS

| | | |
|---|---|---|
| JP | 4819136 B2 | 11/2011 |
| JP | 2014-079400 A | 5/2014 |
| JP | 2014-170397 A | 9/2014 |

OTHER PUBLICATIONS

Written Opinion issued in Application No. PCT/JP2016/071304, dated Sep. 13, 2016 (5 pages).

* cited by examiner

INFORMATION PROCESSING SYSTEM, PROGRAM AND SERVER FOR CARRYING OUT COMMUNICATION AMONG PLAYERS DURING A GAME

TECHNICAL FIELD

The present invention relates to information processing systems, programs, and servers.

BACKGROUND ART

As games that can be executed on terminals such as smartphones, games in which a plurality of players can participate, such as multi-battles, have existed in the past.

In many cases, a function for carrying out communication among the plurality of players during the execution of such a game is provided (e.g., see Patent Literatures 1 to 3).

CITATION LIST

Patent Literature

{PTL 1}
Japanese Unexamined Patent Application, Publication No. 2000-135378
{PTL 2}
Japanese Unexamined Patent Application, Publication No. 2002-346230
{PTL 3}
Japanese Unexamined Patent Application, Publication No. 2014-170397

SUMMARY OF INVENTION

Technical Problem

However, although free-text chat functions are provided in many existing games as functions for carrying out communication among a plurality of players, the speed of character input using a software keyboard on a smartphone is low compared with the speed of proceedings in the game and hinders smooth communication among the plurality of players.

Thus, in order to improve the input speed, instead of free text, it is conceivable to send and receive fixed stamps or fixed text messages, which can be entered with a very quick and easy operation, such as a tap operation.

However, in existing technologies, since the numbers of kinds of stamps, etc. that are provided in games are very small and there is no mechanism for controlling a large number of stamps, the method in which fixed stamps or fixed text messages are sent and received is not suitable for carrying out communication among a plurality of players in that the kinds of messages that can be conveyed among the players are extremely limited.

Thus, in order to provide a high representation ability, it is necessary to increase the number of kinds of stamps, etc.

However, in the case where the number of kinds of stamps, etc. is increased, it is difficult for a player to find a stamp, etc. that suits a current game situation from the large number of kinds of stamps, etc., and the player may need a long time to find a suitable stamp in some cases.

Specifically, after the player finds a stamp, etc. to send and before the stamp, etc. is sent, a very quick and easy operation, such as a tap operation, suffices to send the stamp, etc.; however, since it takes time to find the stamp, etc., it can hardly be said that the total input speed is high. With this level of input speed, it is not possible to follow the quick tempo of a game such as a multi-battle, which hinders smooth communication among a plurality of players.

Therefore, in the case where the number of kinds of stamps, etc. is increased, a mechanism for increasing the speed of input via an operation for selecting a stamp, etc. that suits a game situation is necessary.

Although such mechanisms themselves have existed in the past, including those in Patent Literatures 1 to 3 listed above, all of those mechanisms are static ones that operate according to certain predetermined patterns.

However, in a game such as a multi-battle, since the situation changes from moment to moment, even if such an existing static mechanism is adopted, it is difficult to enable quick input via an operation for selecting a stamp, etc. that suits the game situation.

As described above, there is a demand for establishing a function for sending and receiving stamps, etc., which provides a high representation ability and enables quick input via an operation for selecting a stamp, etc. that suits a game situation, as a function for carrying out communication among a plurality of players during the execution of a game.

However, with existing technologies, including those in Patent Literatures 1 to 3, it is very difficult to establish such a function.

It is an object of the present invention to establish a function for sending and receiving stamps, etc., which provides a high representation ability and enables quick input via an operation for selecting a stamp, etc. that suits a game situation, as a function for carrying out communication among a plurality of players during the execution of a game.

Solution to Problem

In order to achieve the above object, an information processing system according to an aspect of the present invention is:

an information processing system including a plurality of terminals that are capable of accepting individual operations by a plurality of players and executing a game and also including a server, wherein each of the plurality of terminals includes:

a display control means for executing control so as to display a list including a plurality of symbols as candidate symbols that can be sent to another terminal, the symbols each being associated with a predetermined code and constituted of characters, a graphic, a sign, or a combination of these elements; and a sending control means for executing control so as to set one of the plurality of candidate symbols, selected by the player, as an item to send and so as to send the code associated with the item to send to another terminal, and wherein the terminal or the server includes:

a management means for managing each of the plurality of candidate symbols in association with metadata indicating a certain situation in the game;

a listing-order control means for controlling, on the basis of individual correlations between the plurality of metadata individually associated with the plurality of candidate symbols managed by the management means and situation data indicating a current situation in the game being executed, a listing order for displaying the plurality of candidate symbols under the control by the display control means; and an updating means for updating, on the basis of the result of selection of the item to send by the player, the content of the metadata for each of the plurality of candidate symbols managed by the management means.

Advantageous Effects of Invention

The present invention makes it possible to establish a function for sending and receiving stamps, etc., which provides a high representation ability with a huge number of prepared stamps and enables quick input via an operation for selecting a stamp, etc. that suits a game situation when compared with existing technologies, as a function for carrying out communication among a plurality of players during the execution of a game.

DESCRIPTION OF EMBODIMENTS

An embodiment of the present invention will be described below with reference to the drawings.

It is to be understood that what are simply referred to as "images" hereinafter should be construed to include both "moving images" and "still images".

Furthermore, "moving images" should be construed to include images that are displayed individually through the following first processing to third processing.

First processing refers to processing for displaying a series of still images, while continuously switching among them as time passes, for individual actions of objects (e.g., game characters) in planar images (2D images). Specifically, two-dimensional animation, i.e., processing similar to what is called book flipping, is an example of first processing.

Second processing refers to processing for presetting motions corresponding to individual actions of objects (e.g., game characters) in stereoscopic images (images based on 3D models) and displaying the objects while changing the motions as time passes. Specifically, three-dimensional animation is an example of second processing.

Third processing refers to processing for preparing videos (i.e., moving images) corresponding to individual actions of objects (e.g., game characters) and rendering the videos as time passes.

Figure 1:
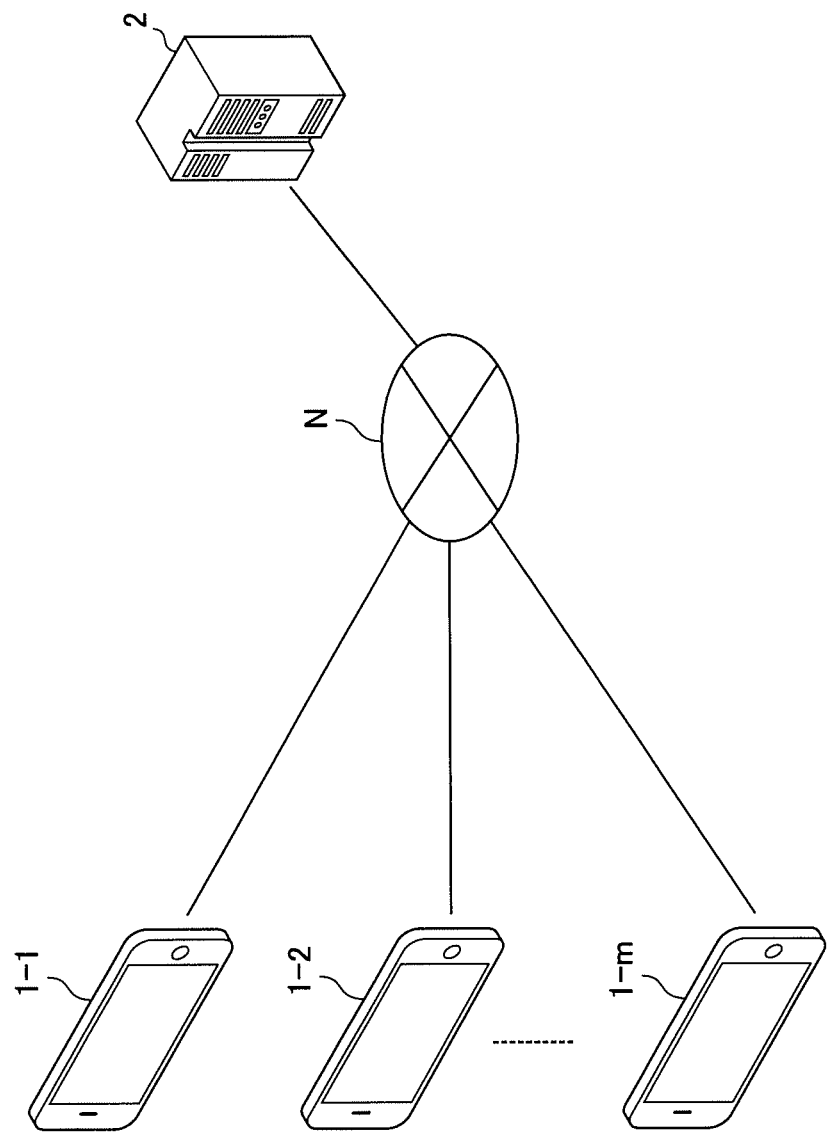
FIG. 1 is a block diagram showing the configuration of an information processing system according to an embodiment of the present invention.

FIG. 1 shows the configuration of an information processing system according to an embodiment of the present invention.

The information processing system shown in FIG. 1 is a system including player terminals 1-1 to 1-*m* individually used by m players (m is an arbitrary integer greater than or equal to 1) and also including a server 2. The individual player terminals 1-1 to 1-*m* and the server 2 are connected to each other via a predetermined network N, such as the Internet.

The server 2 provides the individual player terminals 1-1 to 1-*m* with a game execution environment to provide various services relating to a game that is executed at the individual player terminals 1-1 to 1-*m*.

As such a service, in this embodiment, it is possible to send and receive various kinds of information among the player terminals 1-1 to 1-*m*, in other words, among the individual players. Here, although the information that can be sent and received may be text manually entered by the players, it often hinders smooth proceeding of a game or interferes with the game operation by a player to enter text while playing the game.

Thus, in this embodiment, stamps that can be sent by a simple operation, such as a single tap, are adopted as information that can be sent and received.

Hereinafter, in the case where there is no need for distinction among the individual player terminals 1-1 to 1-*m*, these will be referred to collectively as "player terminals 1".

Figure 2:
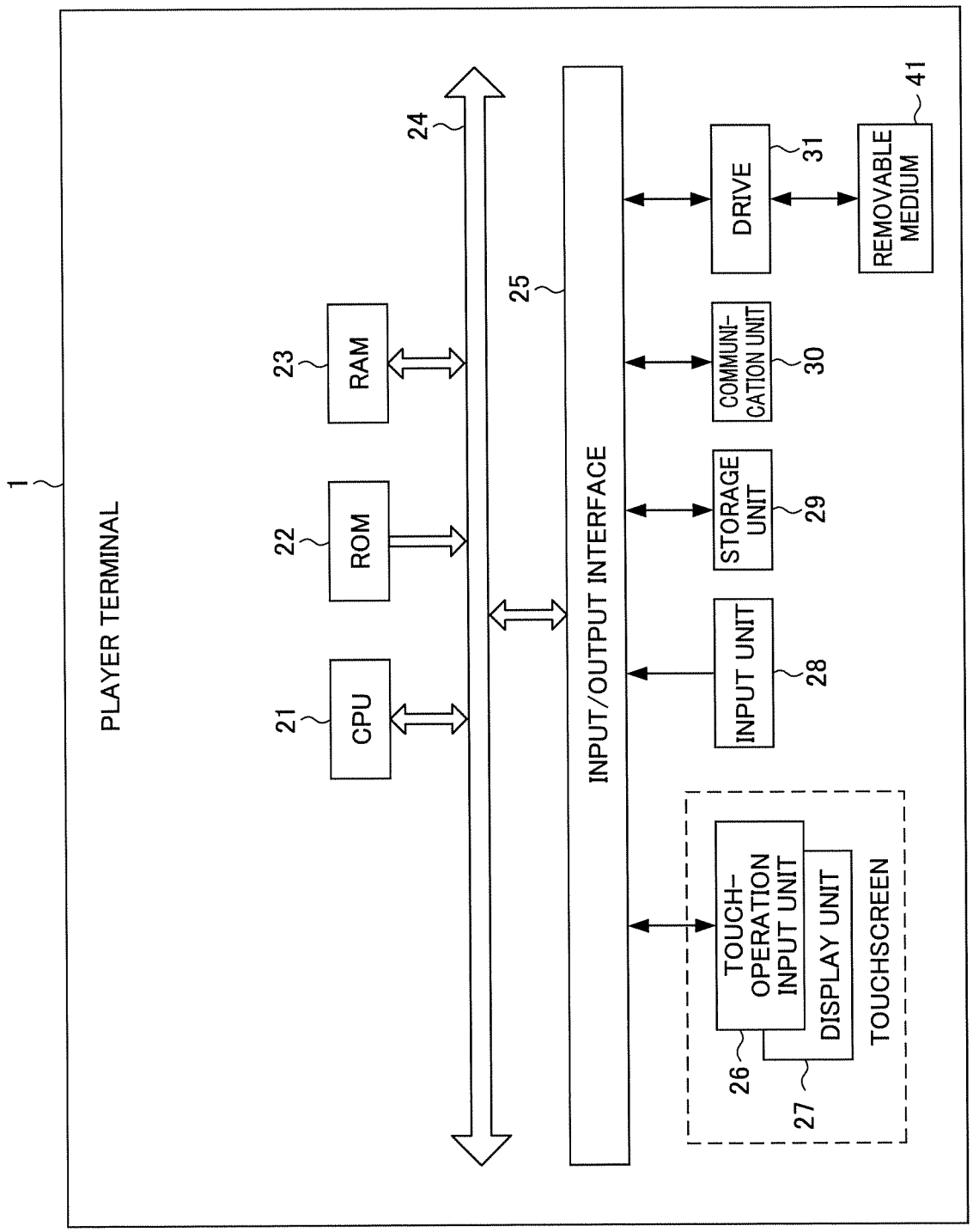
FIG. 2 is a block diagram showing, in the information processing system in FIG. 1, the hardware configuration of a player terminal according to the embodiment of the present invention.

FIG. 2 is a block diagram showing, in the information processing system in FIG. 1, the hardware configuration of a player terminal 1 according to an embodiment of the present invention.

The player terminal 1 is implemented by a smartphone or the like.

The player terminal 1 includes a CPU (Central Processing Unit) 21, a ROM (Read Only Memory) 22, a RAM (Random Access Memory) 23, a bus 24, an input/output interface 25, a touch-operation input unit 26, a display unit 27, an input unit 28, a storage unit 29, a communication unit 30, and a drive 31.

The CPU 21 executes various kinds of processing according to programs recorded in the ROM 22 or programs loaded from the storage unit 29 into the RAM 23.

The RAM 23 also stores, as appropriate, data, etc. that are needed when the CPU 21 executes various kinds of processing.

The CPU 21, the ROM 22, and the RAM 23 are connected to each other via the bus 24. The input/output interface 25 is also connected to the bus 24. The touch-operation input unit 26, the display unit 27, the input unit 28, the storage unit 29, the communication unit 30, and the drive 31 are connected to the input/output interface 25.

The touch-operation input unit 26 is constituted of, for example, capacitive or resistive (pressure-sensitive) position input sensors that are laid over the display surface of the display unit 27, which detect the coordinates of a position at which a touch operation is performed.

The touch operation here refers to bringing something into contact with or in proximity to the touch-operation input unit 26. What is brought into contact with or in proximity to the touch-operation input unit 26 is, for example, a player's finger or a stylus. Hereinafter, a position at which a touch operation is performed will be referred to as a "touched position", and the coordinates of the touched position will be referred to as "touched coordinates".

The display unit 27 is implemented by a display, such as a liquid crystal display, and displays various kinds of images, such as images related to the game.

As described above, in this embodiment, a touchscreen is constituted of the touch-operation input unit 26 and the display unit 27.

The input unit 28 is constituted of various kinds of hardware buttons, etc. and allows input of various kinds of information in accordance with instruction operations performed by the player.

The storage unit 29 is implemented by a DRAM (Dynamic Random Access Memory) or the like and stores various kinds of data.

The communication unit 30 controls communication carried out with other devices (the server 2 and the other player terminals 1 in the example in FIG. 1) via the network N, including the Internet.

The drive 31 is provided as needed. A removable medium 41 implemented by a magnetic disk, an optical disk, a magneto-optical disk, a semiconductor memory, or the like is loaded in the drive 31 as appropriate. A program read from the removable medium 41 by the drive 31 is installed in the storage unit 29 as needed. The removable medium 41 can also store various kinds of data stored in the storage unit 29, similarly to the storage unit 29.

Figure 3:
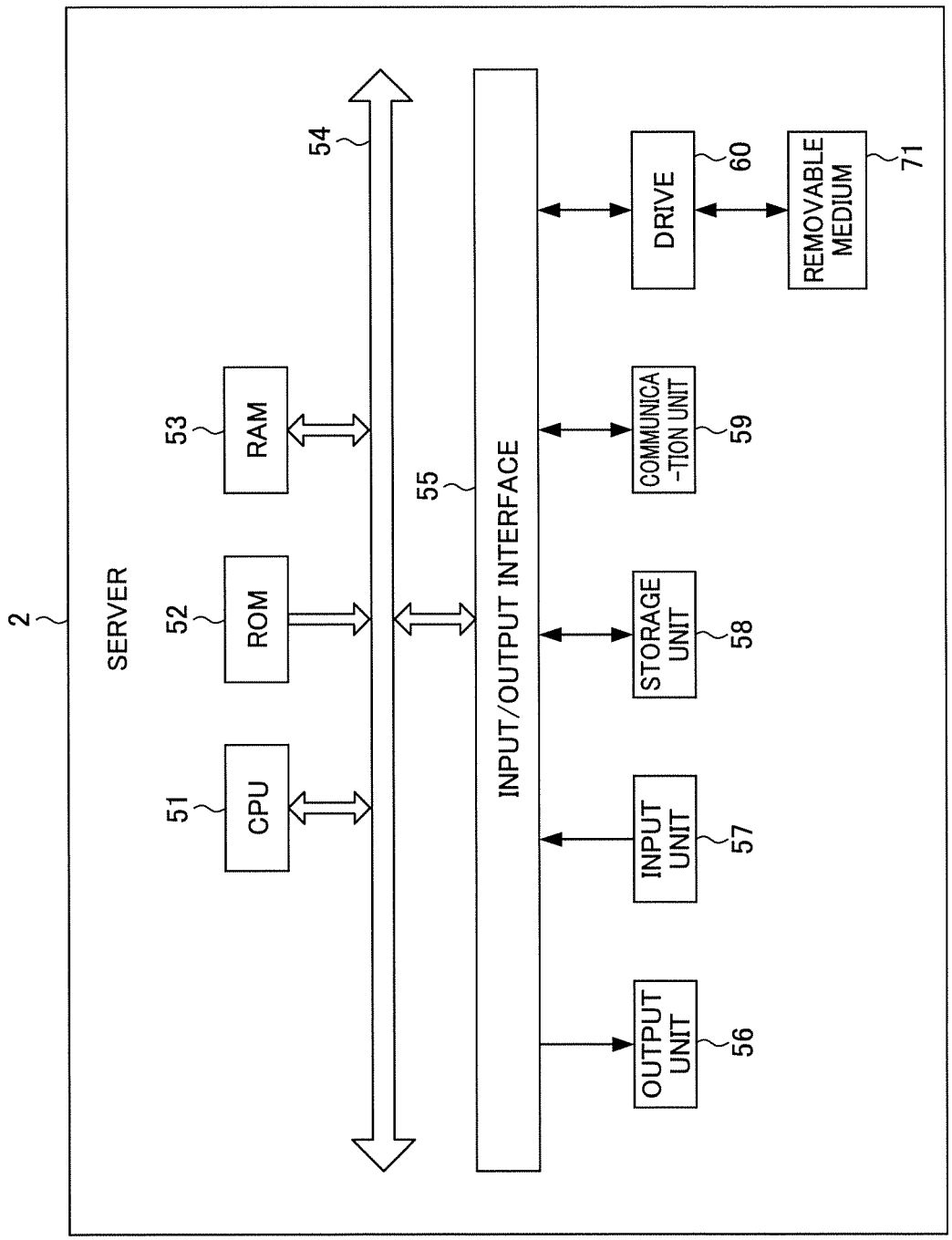
FIG. 3 is a block diagram showing, in the information processing system in FIG. 1, the hardware configuration of a server according to an embodiment of the present invention.

FIG. 3 is a block diagram showing, in the information processing system in FIG. 1, the hardware configuration of the server 2 according to an embodiment of the present invention.

The server 2 includes a CPU 51, a ROM 52, a RAM 53, a bus 54, an input/output interface 55, an output unit 56, an input unit 57, a storage unit 58, a communication unit 59, and a drive 60.

Since the configuration of the server 2 is basically the same as that of the player terminal 1 with the touchscreen thereof removed, a description thereof will be omitted here.

Through cooperation between the various kinds of hardware and various kinds of software in the player terminal 1 in FIG. 2 and the server 2 in FIG. 3, it becomes possible to execute a game on the player terminal 1. Here, this embodiment is directed to a game in which a plurality of players participate, such as a multi-battle. Thus, through cooperation between the various kinds of hardware and various kinds of software in the player terminal 1 and the server 2 in FIG. 3, it also becomes possible to send and receive stamps among the plurality of players participating in the game.

That is, in a game in which a plurality of players participate, such as a multi-battle, it is desired that the plurality of players can communicate with each other, for example, when the plurality of players cooperatively execute a certain task (e.g., beating an enemy).

As a conventional method for such communication, a method in which a free-text chat function is used is well known.

However, in a multi-battle, the situation changes in real time from moment to moment, and the tempo (the speed of the proceeding of the game) is very fast. Accordingly, as a method of communication among a plurality of players, it is required that information that is needed in a current situation can be conveyed to other players in synchronization with such a fast tempo. With the conventional method using a free-text chat function, which requires a long time for text input operation, it is very difficult to satisfy this requirement.

In this respect, a method in which a stamp sending function is used, which makes it possible to send a stamp, for example, with a single tap operation, is suitable for a multi-battle, in which the situation changes in real time, compared with the case where the conventional free-text chat function is used.

However, it cannot be said that simply adopting the method using a stamp sending function is always suitable for a multi-battle.

For example, if a player takes a long time to find a stamp to send, it will not be possible to follow the fast tempo of a multi-battle, in which the situation changes in real time.

Here, if the number of kinds of candidates of a stamp to send is small, naturally, the player will be able to find a desired stamp in a short time, and thus it will be possible to follow the fast tempo of a multi-battle.

However, considering a case where communication is carried out just with stamps without using free text, it is necessary to prepare a large number of kinds of stamps that suit various situations.

If a large number of stamps are displayed on a terminal in the form of a list having a predefined fixed order, the player has to find a desired stamp by visually searching each time. Therefore, it is highly likely that the player will take a long time to find a desired stamp and to execute an operation (a single tap operation) for issuing a sending instruction, which makes it very difficult to follow the fast tempo of a multi-battle.

As conventional methods for overcoming this problem, it is possible to adopt a method in which a stamp selection list is manually reordered or a method in which the player performs an operation for inserting a desired stamp in a place holder provided in advance.

With these conventional methods, however, it is difficult to present stamps that suit different situations in real time as the multi-battle situation changes. In particular, this difficulty is prominent in the genre of RPGs. This is because, in the genre of RPGs, since it is necessary to take various strategies in view of the features of enemies that appear, it is very difficult to predict and prepare a stamp that will suit a strategy that is taken at a certain timing, in advance of that timing.

To summarize what has been described above, in the case where the method using a stamp sending function is adopted as a method that is suitable for communication among a plurality of players in a multi-battle, in which the situation changes in real time, it is necessary to enable each player to quickly select stamps in accordance with various situations.

Specifically, in order to enable each player to quickly select stamps in accordance with various situations, it is necessary to solve the following three problems.

A first issue is to make it possible to provide a number of stamps necessary and sufficient for various situations in a multi-battle.

In recent multi-battles, players are given extremely high degrees of freedom; that is, they participate in battles via combinations of various characters, and multi-battle situations considerably change depending on combinations of actions of those characters.

Here, for example, in the genre of RPGs, the multi-battle situations refer to the HPs or the statuses such as increased or decreased power of enemy characters or the HPs or the statuses such as increased or decreased power of ally characters.

As described above, a multi-battle involves an extremely large variety of situations, and the situations change in real time. Therefore, it is necessary to provide a number of kinds of stamps necessary and sufficient for the various individual situations.

Even if this first problem is solved, i.e., even if it becomes possible to provide a number of kinds of stamps necessary and sufficient for various situations in a multi-battle, if it is not possible for a player to quickly select a stamp that suits a current situation, it cannot be said that the method is compatible with various situations in a multi-battle.

In order to enable a player to quickly select a stamp that suits a current situation, it is desired that the system can recommend or otherwise present stamps that suit the current situation to the player.

Thus, a second problem is to make it possible to dynamically calculate the relevance between situations changing from moment to moment in a multi-battle and stamps.

In a multi-battle, game situations change from moment to moment, and a huge number of combinations of elements constituting situations are involved. Thus, it is very difficult to predict and define those situations in advance.

Furthermore, such games are being updated day by day for extension and improvement, and thus the situations that occur in multi-battles are constantly changing. It is not practically possible to statically and manually define relationships between stamps and battle situations so as to follow such updates.

Even if this second problem is solved, whereby it becomes possible to recommend or otherwise present stamps that suit a current situation from the system to a player, it is the server 2, not the player, that determined that the stamps "suit the current situation". Therefore, the stamps recommended or otherwise presented do not necessarily suit (accepted as desired stamps by) all the players.

Thus, a third problem is to enable personalization.

That is, since the preferences of individual players are strongly reflected in the selection of stamps, it is necessary to reflect the personal differences among individual players in calculating the relevance between multi-battle situations and stamps.

The information processing system in this embodiment is a system that can realize a user interface that can solve the first to third problems described above. That is, the information processing system in this embodiment realizes a user interface that enables a player to intuitively and readily select a stamp from among a huge number of stamps (the situation in which the first problem has been solved) that suit various situations in a multi-battle.

Specifically, the information processing system in this embodiment realizes a function for continuously reordering stamps in descending order of usage possibility in real time as the game situation changes in a multi-battle and a function for autonomously learning the relevance between game situations and stamps through feedback of information about a stamp actually selected by a player.

These functions are realized by a mechanism for dynamically calculating the relevance between metadata associated with stamps and metadata indicating situations changing from moment to moment in the game (hereinafter referred to as "situation data"), while reflecting the personal differences among individual players (a mechanism for solving the second and third problems).

Processing through which the information processing system in this embodiment exhibits these functions will hereinafter be referred to as "stamp processing".

Figure 4:
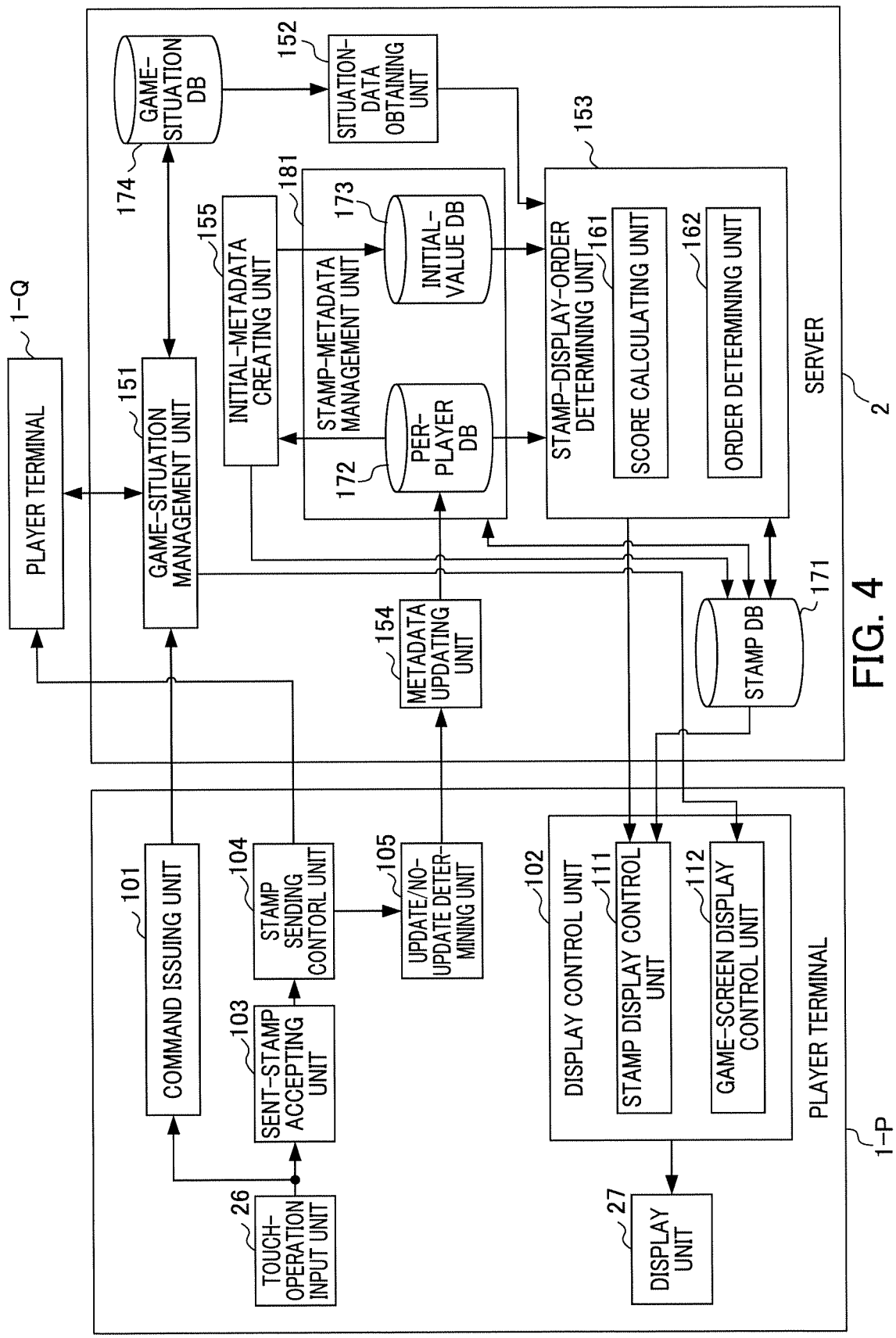
FIG. 4 is a functional block diagram showing an example of the functional configurations of the player terminal in FIG. 2 and the server in FIG. 3.

FIG. 4 is a functional block diagram showing the functional configurations at the time of the execution of the stamp processing in the functional configurations of the player terminal 1 and the server 2.

In FIG. 4, a player terminal 1-P represents a terminal on the stamp sending side among the player terminals 1-1 to 1-*m*, and a player terminal 1-Q represents a terminal on the stamp receiving side among the player terminals 1-1 to 1-*m*. That is, each of the player terminals 1-1 to 1-*m* can act as a player terminal 1-P and can also act as a player terminal 1-Q since it has a function for both sending and receiving stamps.

The CPU 21 of the player terminal 1-P functions as a command issuing unit 101, a display control unit 102, a sent-stamp accepting unit 103, a stamp sending control unit 104, and an update/no-update determining unit 105.

The CPU 51 of the server 2 functions as a game-situation management unit 151, a situation-data obtaining unit 152, a stamp-display-order determining unit 153, a metadata updating unit 154, and an initial-metadata creating unit 155.

In an area of the storage unit 58 of the server 2, a stamp DB 171, a per-player DB 172, an initial-value DB 173, and a game-situation DB 174 are provided. The per-player DB 172 and the initial-value DB 173 constitute a stamp-metadata management unit 181.

The command issuing unit 101 of the player terminal 1-P issues various commands used in the game on the basis of touch operations by the player via the touch-operation input unit 26.

Although not shown, the command issuing unit 101 also functions at the player terminal 1-Q (all the player terminals 1-1 to 1-*m*).

The game-situation management unit 151 manages changes in the game situation as changes occur on the basis of commands, etc. issued from the individual player terminals 1-P and 1-Q (all the player terminals 1-1 to 1-*m*) and stores game situation data changing in real time in the game-situation DB 174.

Although the game-situation DB 174 is configured as an element of the server 2 in this embodiment, there is no particular limitation to this configuration.

For example, the game-situation DB 174 may be provided in an existing database server for a social network game. As another example, for the purpose of load distribution, instead of using a master database that is directly accessed by the server 2 for the game, the game-situation DB 174 may be provided in a replication server to which data is periodically copied from a master database.

The display control unit 102 of the player terminal 1-P includes a stamp display control unit 111 and a game-screen display control unit 112.

The stamp display control unit 111 executes control for displaying a list of multiple stamps that can be sent to the player terminal 1-Q (hereinafter referred to as "candidate stamps") on the display unit 27.

The game-screen display control unit 112 executes control for displaying a game screen on the display unit 27.

Figure 5:
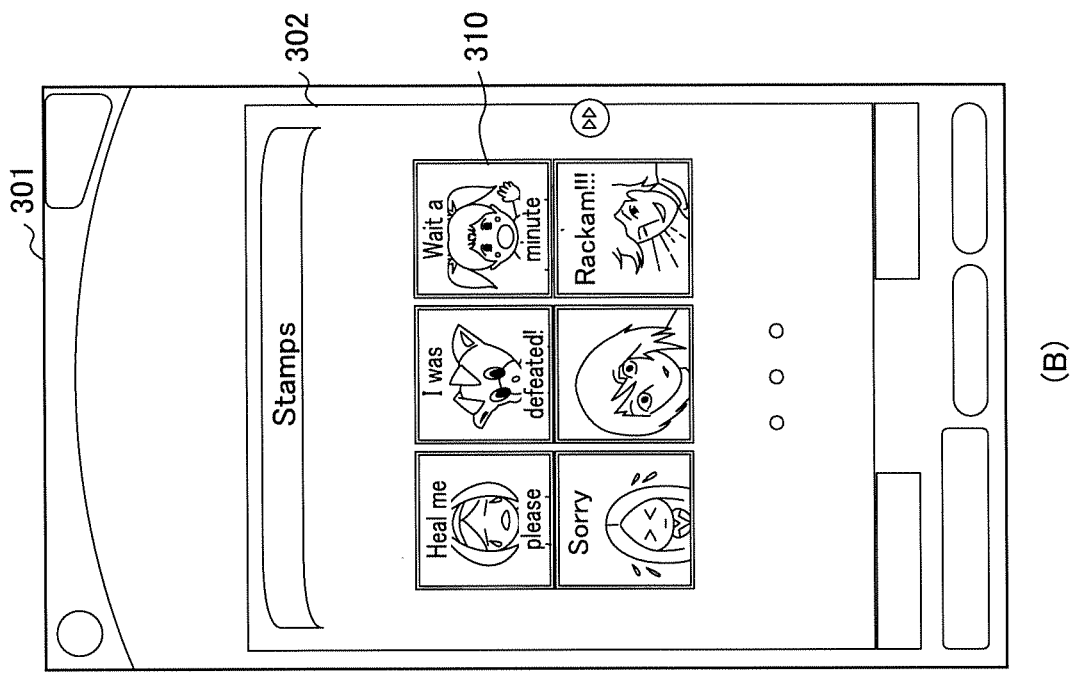
FIG. 5 shows an example of a screen that is displayed on the player terminal during the execution of a game.
Figure 5:
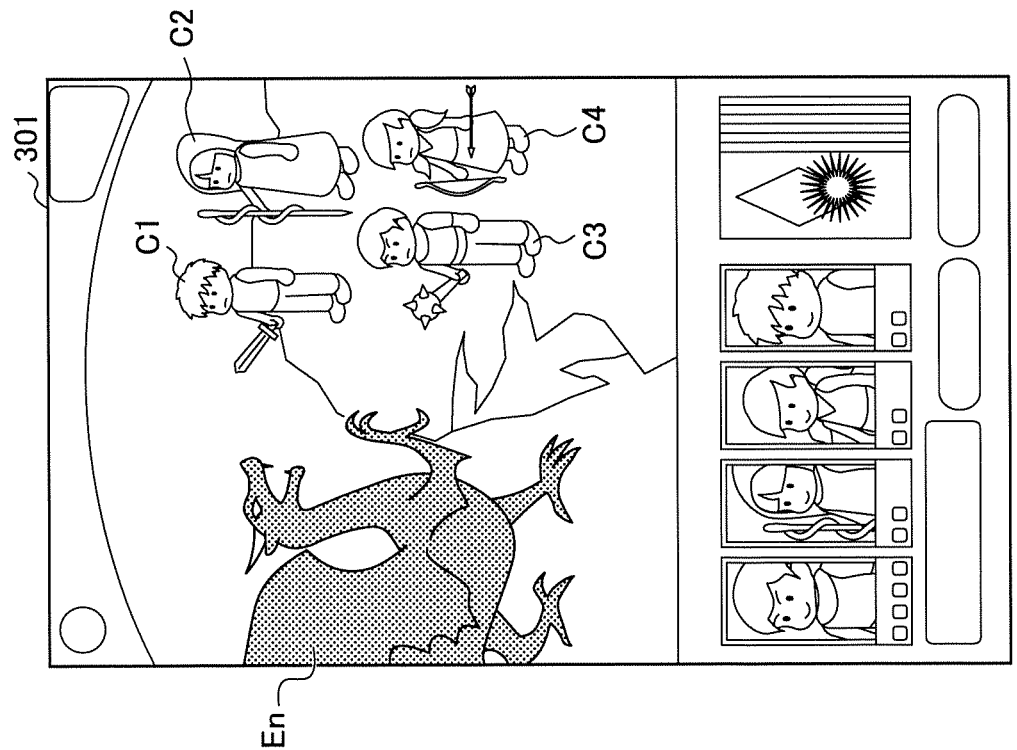

FIG. 5 shows an example of a screen that is displayed on the player terminal 1-P during the execution of the game.

Part (A) of FIG. 5 shows an example of a game screen 301.

Part (B) of FIG. 5 shows an example of a stamp selecting screen 302 that is superimposed on the game screen 301.

The stamp selecting screen 302 displays a list including a plurality of (six in the example in part (B) of FIG. 5) candidate stamps 310 that can be selected by the player.

Here, the kinds and the listing order of the candidate stamps 310 displayed in the stamp selecting screen 302 in part (B) of FIG. 5 are not predefined and fixed as in conventional methods but are dynamically changed in accordance with the game situation displayed in the game screen 301 in part (A) of FIG. 5.

Specifically, for example, suppose that a plurality of players are participating in a battle with a strong enemy En in a multi-battle, as shown in the game screen 301 in part (A) of FIG. 5.

In the example in part (A) of FIG. 5, one player is operating the player terminal 1-P to operate four ally characters C1 to C4, and characters of the other players operating the player terminal 1-Q, etc. are not displayed in the game screen 301.

Suppose, for example, that the ally character C1 of the player at the player terminal 1-P has been severely damaged by an attack by the enemy En in this battle.

In the game situation in this case, the HP of the ally character C1 is low (on the verge of death). Such situations are managed by the game-situation management unit 151 and are stored in the game-situation DB 174 at the server 2 in FIG. 4. Here, since the game situation changes from moment to moment, the information stored in the game-situation DB 174 is updated in real time.

The situation-data obtaining unit 152 obtains the information stored in the game-situation DB 174 in the form of situation data and provides the situation data to the stamp-display-order determining unit 153.

Specifically, in the example in FIG. 5, the information stored in the game-situation DB 174 indicates a game situation in which the HP of an ally is low. In this case, the situation-data obtaining unit 152 maps the game situation in which the HP of an ally is low to a multi-dimensional vector space to generate situation data and supplies the situation data to the stamp-display-order determining unit 153.

Meanwhile, the individual stamps that can be provided by the server 2 have assigned thereto, as metadata, data obtained by mapping situations that suit the stamps to the multi-dimensional vector space in advance.

This association between the individual stamps and the metadata is managed by the stamp-metadata management unit 181. For example, a stamp for asking for recovery or a stamp for conveying to colleagues that the player's character has been damaged has assigned thereto, as metadata, data obtained by mapping a situation that is the same as or similar to the game situation in which the HP of an ally is low to the multi-dimensional vector space in advance.

At this time, the stamp-display-order determining unit 153, on the basis of the individual correlations between a plurality of pieces of metadata individually associated with a plurality of stamps managed by the stamp-metadata management unit 181 and the situation data indicating the current game situation, determines the listing order for displaying the plurality of stamps at the player terminal 1-P.

In the example in FIG. 5, the situation data indicating the current game situation is situation data indicating that the HP of an ally is low, as described earlier.

Therefore, the situation data has a high correlation with metadata indicating a situation that is the same or similar to the situation in which the HP of an ally is low. The listing order is determined such that stamps associated with such metadata having high correlations, i.e., the stamp for asking for recovery and the stamp for conveying to colleagues that the player's character has been damaged, are placed at high ranks. As a result, the stamp selecting screen 302 in part (B) of FIG. 5 is displayed at the player terminal 1-P.

Figure 6:
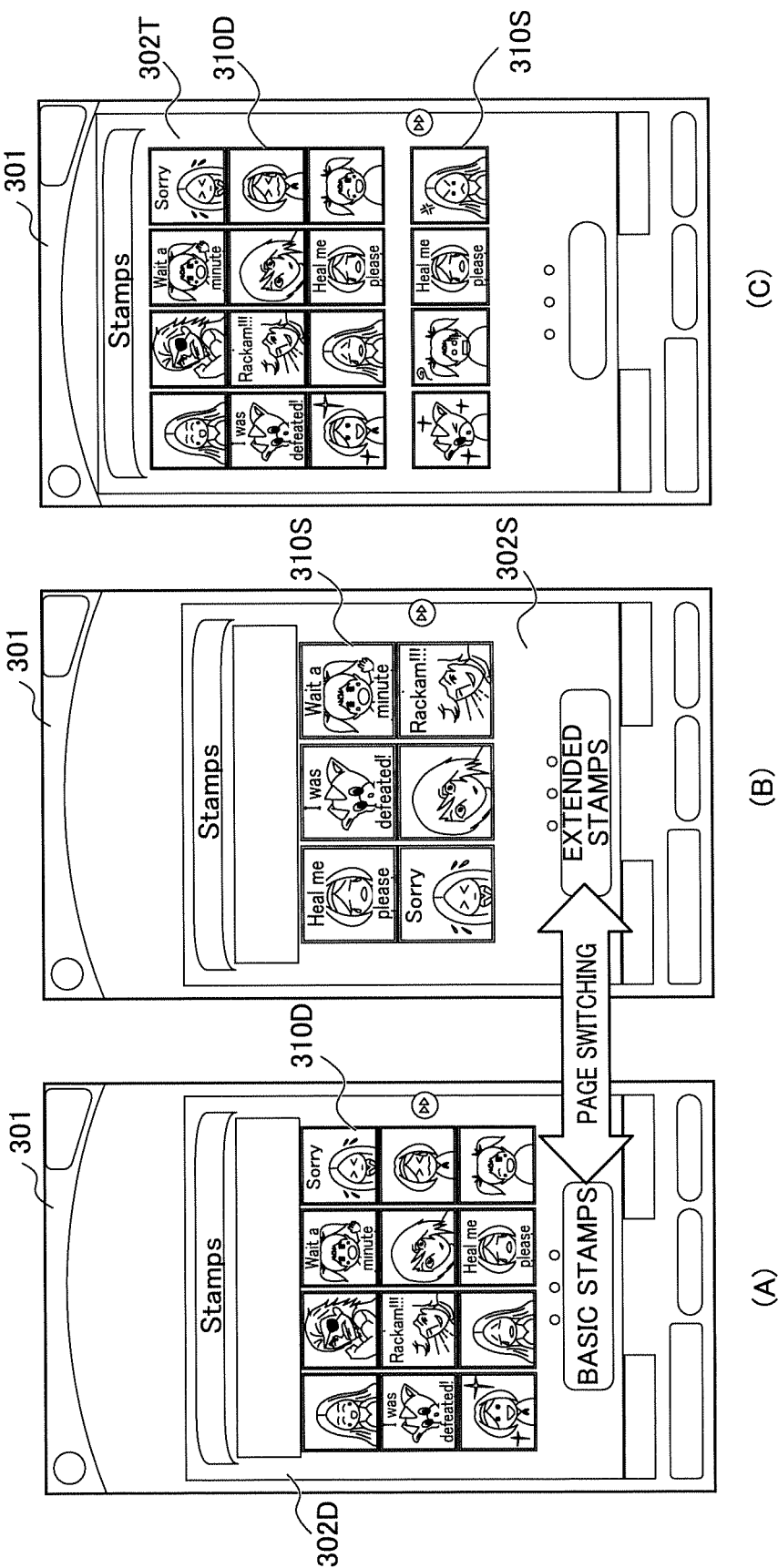
FIG. 6 shows examples of a stamp screen that is displayed on the player terminal during the execution of the game, which are different from the example in FIG. 5.

FIG. 6 shows examples of a stamp screen that is displayed on the player terminal 1-P during the execution of the game, which are different from the example in FIG. 5.

Part (A) of FIG. 6 shows an example of a conventional stamp screen 302D in which the listing order of stamps 310D is fixed, i.e., an example of the conventional stamp screen 302D constituted of a static stamp list.

Part (B) of FIG. 6 shows an example of a stamp screen 302S in which the listing order of candidate stamps 310S is changed as the game situation changes, i.e., an example of the stamp screen 302S constituted of a dynamic stamp list according to the present invention.

Here, the conventional stamp screen 302D in part (A) of FIG. 6 and the stamp screen 302S according to the present invention in part (B) of FIG. 6 may coexist instead of being separate and independent. Specifically, the player can switch pages from one to the other of the conventional stamp screen 302D in part (A) of FIG. 6 and the stamp screen 302S according to the present invention in part (B) of FIG. 6 by performing a predetermined touch operation.

Part (C) of FIG. 6 shows a stamp screen 302T that simultaneously displays, in different sections of the screen, a conventional stamp list in which the listing order of stamps 310D is fixed and a stamp list according to the present invention in which the listing order of candidate stamps 310S is changed in accordance with the game situation.

As described above, a conventional static stamp list and a dynamic stamp list according to the present invention can coexist. The method for this coexistence is not particularly limited, and the method for coexistence based on page switching, shown in parts (A) and (B) of FIG. 6, or the method of coexistence within the same screen, shown in part (C) of FIG. 6, may be adopted.

Here, processing for dynamically changing the listing order of candidate stamps in such a dynamic stamp list according to the present invention is executed by the stamp-display-order determining unit 153 of the server 2 (FIG. 4).

Thus, the function of the stamp-display-order determining unit 153 will be described below in further detail with reference to FIG. 7.

Figure 7:
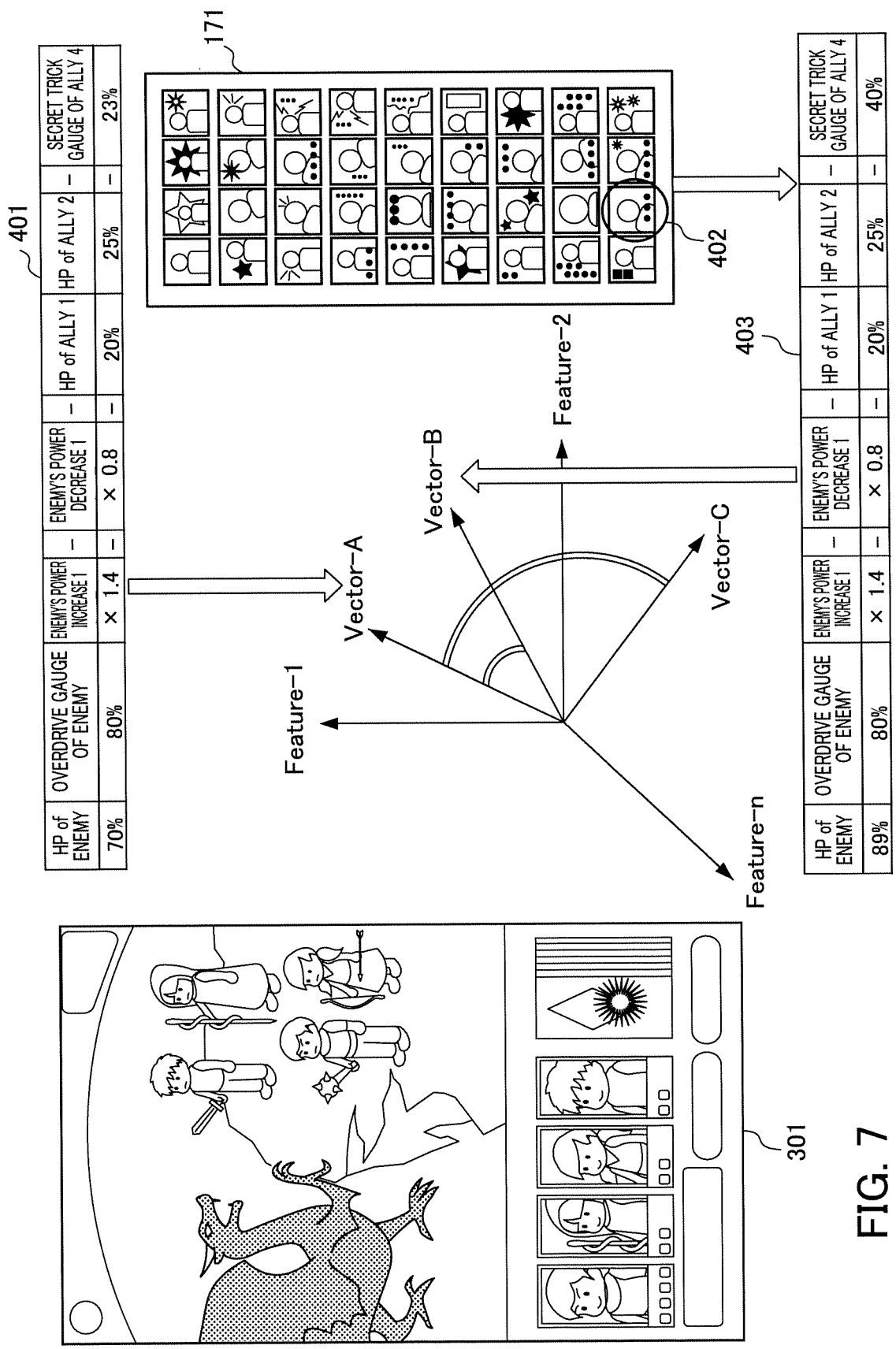
FIG. 7 is an illustration for explaining a method of calculating a correlation between stamp metadata and game situation data by using a multi-dimensional vector space model.

FIG. 7 is an illustration for explaining a method of calculating a correlation between stamp metadata and game situation data by using a multi-dimensional vector space model.

In this embodiment, the correlation between situation data 401 indicating a game situation and metadata 403 associated with a certain stamp 402 stored in the stamp DB 171 is represented as the distance between vector A and vector B as individually mapped to a multi-dimensional vector space. The method for calculating the distance is not particularly limited; for example, a method using the inner product or cosine similarity between the vectors may be adopted.

Hereinafter, such vectors mapped to the multi-dimensional space will be referred to as "metadata vectors M".

By representing both situation data indicating a game situation and metadata associated with a stamp as metadata vectors M having the same structure, it becomes possible to compare these vectors in the multi-dimensional vector space. This makes it possible to recommend stamps having high correlations (place the stamps at high ranks in the listing order), while responding in real time to changes constantly occurring in the multi-battle situation.

The individual elements constituting a metadata vector M are the individual values of attribute information of the player or the enemy in the game, e.g., various parameters such as the level or the HP/MP, owned items, and owned skills.

Specifically, a metadata vector M is defined as expressed in equation (1) below:

[Eq. 1]

$$M := <f_1, f_2, \ldots, f_n> \quad (1)$$

Here, fi signifies a real value in a range of 0 to 1 corresponding to the i-th attribute in the game attribute information of a player. Preferably, these values of fi should be infinity-norm normalized. For example, in the case of a game in which the maximum level is 100, by normalizing the values of levels to a maximum value, it is possible to represent fi such that level 1 is 0.01 and level 100 is 1.

Also, when representing the number of owned items with a value of fi, it is possible to normalize the number to a maximum number of items that can be owned.

The number of attributes n may become on the order of hundreds to thousands, depending on the nature of the game. For example, in the case of a game involving 500 kinds of items and 500 kinds of skills, the number of attributes n becomes at least 1000.

That is, the situation data 401 indicating a game situation is represented as vector A having the structure of a metadata vector M, and the metadata 403 associated with the stamp 402 is represented as vector B having the same structure of a metadata vector M.

Here, when vector A representing the situation data 401 indicating a game situation is denoted as "a" and vector B representing metadata 403 associated with the stamp 402 is denoted as "b", a score score(a, b) representing the correlation between a and b can be defined as expressed in equation (2) below:

[Eq. 2]

$$\text{score}(a, b) := \sum_{i=0}^{n} (a_i \cdot b_i) \quad (2)$$

Here, ai signifies a weight (a real value in a range of 0 to 1) for the i-th attribute in the n-dimensional vector space representing the game situation. bi signifies a weight (a real value in a range of 0 to 1) for the i-th attribute in the n-dimensional vector space representing a stamp feature (a certain matching game situation).

A score calculating unit 161 of the stamp-display-order determining unit 153 in FIG. 4 calculates a score(a, b) for vector a representing a certain game situation and each of individual vectors b representing the features of the individual stamps stored in the stamp DB 171.

A stamp having a higher value of the score(a, b) better suits the current game situation. Thus, an order determining unit 162 of the stamp-display-order determining unit 153 determines the listing order for displaying the individual stamps on the player terminal 1-P according to the individual scores score(a, b) of the stamps.

In this manner, a list of the individual candidate stamps in descending order of suitability for the current game situation is displayed on the player terminal 1-P. Accordingly, the player can send a stamp that suits the current game situation from the player terminal 1-P to the player terminal 1-Q just by performing an operation for selecting a high-ranking candidate stamp in the list (e.g., a single tap operation on that candidate stamp).

That is, the sent-stamp accepting unit 103 in FIG. 4 accepts the candidate stamp selected by a touch operation on the touch-operation input unit 26 as a stamp to send (hereinafter referred to as a "sent stamp").

The stamp sending control unit 104 executes control for sending the sent stamp to the player terminal 1-Q.

Here, what is meant by sending a sent stamp is to send information representing a code associated in advance with the sent stamp instead of sending image data of the sent stamp.

For example, this serves to assist global deployment of the game.

That is, it is a conceivable situation that players who speak mutually different languages participate in a single game title.

Stamps are a communication method that is potentially very suitable for a multi-language environment. For example, it is possible to assign a globally common ID (e.g., STAMP00001) to a stamp meaning "Heal me please" and to display a stamp including "hiru purizu" in Japanese on a player terminal 1 running the Japanese version while displaying a stamp including "ging yi zhi wo" in Chinese on a player terminal 1 running the Chinese version.

In this manner, by associating codes in advance with stamps, it is possible to realize stamps compatible with a multi-language environment. This makes it possible to display stamps that are localized for the language environment of each client (player terminal 1) receiving messages. That is, it becomes possible to carry out communication in real time substantially in multiple languages.

In order to realize such multi-language communication, naturally, it is necessary to prepare a large number of kinds of stamps. Therefore, since it is not possible with the conventional static stamps at fixed positions for a player to intuitively and quickly select a stamp of interest from a large number of kinds of stamps, it is necessary to dynamically change the positions of stamps in accordance with the game situation as in this embodiment.

Next, the need for personalization of metadata associated with stamps will be described in detail.

As described earlier, in this embodiment, stamps that suit a current game situation are recommended to the player (displayed at high ranks in a list). However, some players will select other stamps instead of selecting the stamps that are recommended (hereinafter referred to as "recommended stamps").

This means that those players determined that the other stamps selected by themselves better suited the current game situation than the recommended stamps.

That is, stamps that suit the current game situation are not the same for all the players and often vary among the individual players.

Here, a recommended stamp is a stamp associated with metadata that is the same as or similar to situation data indicating the current game situation.

That is, the metadata for the recommended stamp is metadata generated because a "certain entity" determined that a certain game situation suited the stamp and thus indicating the certain game situation. It is because the certain situation was the same as or similar to the current game situation that the stamp associated with the metadata indicating the certain situation was presented to the player as a recommended stamp.

The "certain entity" in this case is often the game administrator or the server 2 in initial recommendation. That is, it is the server 2 that determined that the recommended stamp "suited" the certain situation (which is the same as or similar to the current game situation).

However, individual players have different impressions about the same stamp. Therefore, there are cases where a recommended stamp determined by the server 2 as "suiting the current game situation" is not accepted by some players as "suiting the current game situation".

That is, there are some players who do not select the recommended stamp determined by the server 2 as "suiting the current game situation" but select other stamps determined by themselves as "suiting the current game situation". In this case, it is possible to recognize that those players determined that the recommended stamp did not "suit the current game situation" and the different stamps selected by themselves better "suited the current game situation".

Thus, the metadata updating unit 154 updates the metadata for the individual stamps stored in the stamp DB 171 on the basis of the results of selection of metadata to send by each player, thereby personalizing the metadata (generating metadata specific for the player).

Whether or not to update the metadata is determined by the update/no-update determining unit 105 of the player terminal 1-P.

For example, in the case where the player selected a high-ranking stamp (a stamp recommended by the server 2) in the list of candidate stamps, the update/no-update determining unit 105 determines not to update the metadata.

Meanwhile, in the case where the player selected an intermediate- or low-ranking stamp in the list of candidate stamps, the update/no-update determining unit 105 determines to update the metadata.

In this case, the metadata updating unit 154 of the server 2 creates new metadata, for example, by combining the metadata indicating the current game situation (the metadata for a first stamp recommended by the server 2 but not selected by the player) and the metadata for a second stamp selected by the player. Then, the update/no-update determining unit 105 updates the metadata for the second stamp by substituting the new metadata as the metadata for the second stamp. Accordingly, when a similar situation occurs next time, the second stamp is displayed at a higher rank.

The threshold used by the update/no-update determining unit 105 in determining whether or not to update metadata, i.e., the ranking at which high ranks and intermediate to low ranks are separated, is not particularly limited, and it is desired to set the threshold in accordance with the characteristics of the game title or the quality of metadata.

The metadata updated by the metadata updating unit 154 in this manner is subsequently managed as metadata specific for the player (personalized metadata). That is, for a single stamp, initial-value metadata initially associated by the server 2 (the game administrator) and personalized metadata for each player exist separately.

Thus, information indicating the association between a certain stamp and the initial-value metadata initially associated by the server 2 is stored in the initial-value DB 173. Meanwhile, information indicating the association between the certain stamp and the personalized metadata is stored in the per-player DB 172 on a per-player basis.

Figure 8:
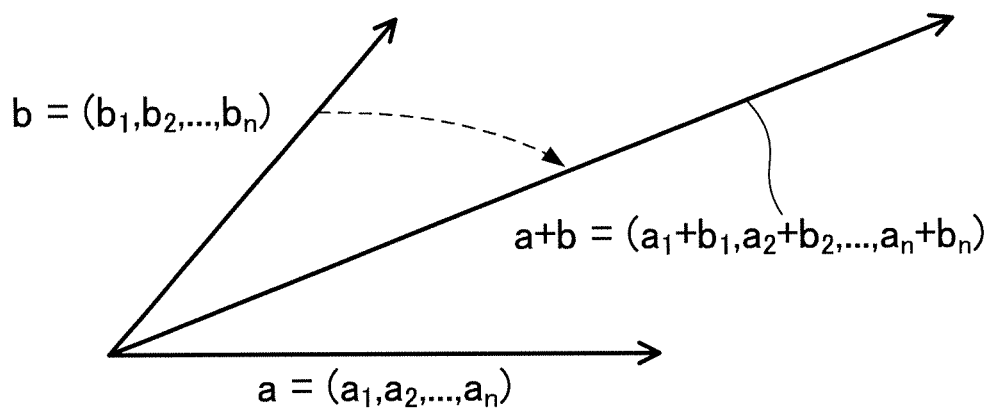
FIG. 8 is an illustration for explaining an example of a method of generating personalized metadata.

FIG. 8 is an illustration for explaining an example of a method of generating personalized metadata.

Similarly to the example in FIG. 7, when a metadata vector M corresponding to situation data indicating a game situation is denoted as "a" and a metadata vector M associated with a stamp selected by a player is denoted as "b", it is possible to personalize the metadata for the stamp selected by the player by executing processing such that b becomes closer to a.

For example, as a simple implementation, a personalization function personalize(a, b) representing the personalized metadata can be defined as a sum of vector a and vector b, as expressed in equation (3) below:

[Eq. 3]

$$\text{personalize}(a,b) := a+b = (a_1+b_1, a_2+b_2, \ldots a_n+b_n) \quad (3)$$

The components of the vector sum represented by the personalization function personalize(a, b) are the sums of the individual components of vector a and vector b. Thus, the personalization function personalize(a, b)=(a1+b1, a2+b2, ... an+bn). That is, a new metadata vector M represented in the form of the personalization function personalize(a, b) is defined as metadata in which both the original features of the stamp selected by the player and the features representing the game situation at the time of the selection by the player are taken into account.

That is, as shown in FIG. 8, vector b (the metadata vector M for the stamp) becomes closer to vector a (the metadata vector M for the game situation) through vector addition processing. As a result, when a similar situation occurs next time, the stamp associated with the personalized vector M (the vector M represented by the personalization function personalize(a, b)) is displayed at a higher rank in the list.

It is to be noted that what is shown in FIG. 8 is only an example. That is, the method of personalizing metadata is not limited to the method in which vectors are simply combined, and any method can be adopted as long as vector b becomes closer to vector a, such as a method in which vectors are combined with weights or a method in which a vector is approximated with a minimum amount of movement.

Referring back to FIG. 4, the initial-metadata creating unit 155 performs statistical processing with the data accumulated in the per-player DB 172, derives generic metadata on the basis of the results of the statistical processing, generates initial-value metadata from the generic metadata, and newly stores the initial-value metadata in the initial-value DB 173.

The method of the statistical processing is not particularly limited, and an arbitrary method may be adopted, such as a method in which the average of each attribute is calculated.

Hereinabove, the functional configurations of the server 2 and the player terminal 1 have been described.

Next, of the processing that is executed by the server 2 having the functional configuration described above, the stamp processing will be described with reference to FIG. 9.

Figure 9:
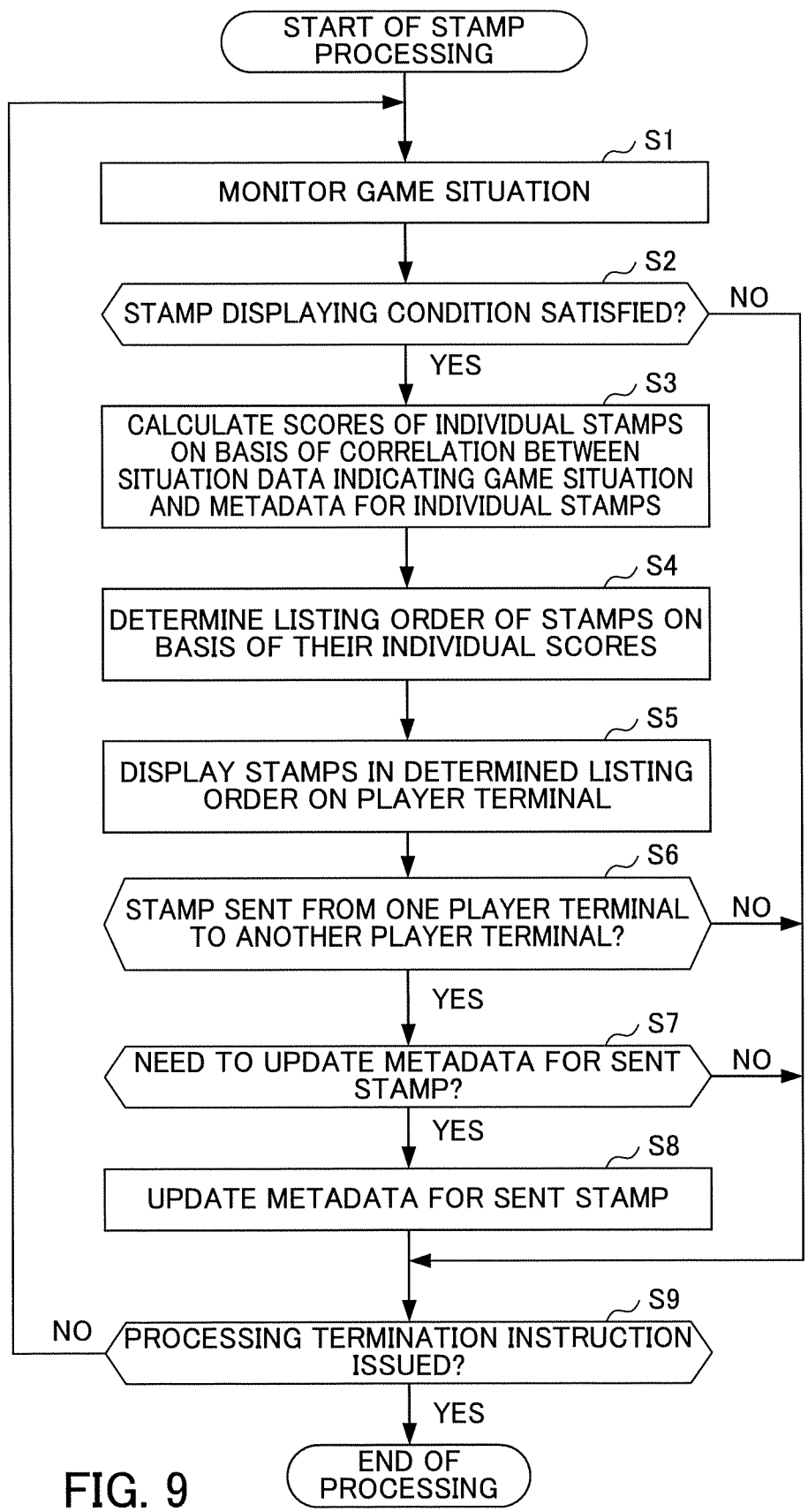
FIG. 9 is a flowchart for explaining the flow of stamp processing that is executed by the server in FIG. 3.

FIG. 9 is a flowchart for explaining the flow of the stamp processing that is executed by the server 2.

In step S1, the game-situation management unit 151 of the server 2 in FIG. 4 monitors the game situation.

In step S2, the game-situation management unit 151 determines whether or not a stamp displaying condition is satisfied.

The stamp displaying condition refers to a condition for displaying stamps that are recommended to the player terminal 1. Although the stamp displaying condition is not particularly limited, for example, an OR condition including the following first and second conditions may be adopted. The first condition refers to a condition that a certain time has passed. The second condition refers to a condition that a change exceeding a predetermined threshold has occurred in the situation data (the metadata vector M) representing the game situation.

In the case where the stamp displaying condition is not satisfied, the determination in step S2 results in NO, and the processing proceeds to step S9.

In step S9, the game-situation management unit 151 determines whether a processing termination instruction has been issued.

The processing termination instruction is not particularly limited, and, for example, an instruction indicating the termination of the game may be adopted.

That is, when the game is terminated and a message to that effect is issued, the determination in step S9 results in YES, and the stamp processing is terminated.

Meanwhile, while the game is being continued, the determination in step S9 results in NO, and the processing returns to step S1.

That is, while the game is being continued, unless the stamp displaying condition is satisfied, loop processing through step S1, NO in step S2, and NO in step S9 is executed repeatedly, and the stamp processing is kept in a wait state.

When the stamp displaying condition is satisfied, the determination in step S2 results in YES, and the processing proceeds to step S3.

In step S3, the score calculating unit 161 of the stamp-display-order determining unit 153 calculates a score of each stamp on the basis of the correlation between the situation data indicating the game situation and the metadata for that stamp.

In step S4, the order determining unit 162 of the stamp-display-order determining unit 153 determines the listing order of the stamps on the basis of their individual scores.

In step S5, the stamp-display-order determining unit 153 displays the stamps in the determined listing order on the player terminal 1 (the player terminal 1-P in the example in FIG. 4).

In step S6, the game-situation management unit 151 determines whether or not a stamp has been sent from a player terminal 1 (the player terminal 1-P in the example in FIG. 4) to another player terminal 1 (the player terminal 1-Q in the example in FIG. 4).

In the case where no stamp has been sent, the determination in step S6 results in NO, and the processing proceeds to step S9 described above.

Meanwhile, in the case where a stamp has been sent, the determination in step S6 results in YES, and the processing proceeds to step S7.

In step S7, the metadata updating unit 154 determines whether or not there is a need to update the metadata for the sent stamp.

As described earlier, whether or not to update the metadata is determined by the update/no-update determining unit 105 of the player terminal 1 (the player terminal 1-P in the example in FIG. 4). Thus, in the case where the update/no-update determining unit 105 has determined that there is no need for updating, the determination in step S7 results in NO, and the processing proceeds to step S9 described above.

Meanwhile, in the case where the update/no-update determining unit 105 has determined that there is a need for updating, the determination in step S7 results in YES, and the processing proceeds to step S8.

In step S8, the metadata updating unit 154 updates the metadata for the stamp. That is, the metadata is updated to become suitable for the player at the player terminal 1 that has sent the stamp (the player terminal 1-P in the example in FIG. 4) and is stored in the per-player DB 172.

After the metadata is personalized in this manner, the processing proceeds to step S9 described above.

Although an embodiment of the present invention has been described above, it is to be noted that the present invention is not limited to the above-described embodiment and that modifications, improvements, etc. within a scope in which it is possible to achieve the object of the present invention are encompassed in the present invention.

For example, although the information that is sent and received for the purpose of communication among the plurality of player terminals 1 is stamps in the above-described embodiment, the information is not particularly limited to stamps, and it suffices for the information to be symbols each being associated with a predetermined code and constituted of characters, a graphic, a sign, or a combination of these elements.

Therefore, for example, the present invention is also applicable to sending and receiving fixed text messages associated with predetermined codes.

Furthermore, for example, the functional configuration in FIG. 4 is only an example, and there is no particular limitation to this example. That is, it suffices that an information processing system be provided with functions that enable the execution of the above-described series of processing steps as a whole, and the choice of functional blocks for implementing the functions is not particularly limited to the example in FIG. 4. Furthermore, the locations of the functional blocks are not particularly limited to those in FIG. 4 and may be arbitrarily set. For example, the functional blocks of the server 2 may be transferred to the player terminal 1, etc., and conversely, the functional blocks of the terminal 1 may be transferred to the server 2, etc.

Furthermore, each functional block may be implemented by hardware alone, by software alone, or by a combination of hardware and software.

In a case where the processing by each functional block is executed by software, a program constituting the software is installed on a computer, etc. via a network or from a recording medium.

The computer may be a computer embedded in special hardware. Alternatively, the computer may be a computer that can execute various functions when various programs are installed thereon, such as a server or a general-purpose smartphone or personal computer.

A recording medium including such a program is implemented by a removable medium (not shown) that is distributed separately from the main unit of the apparatus in order to provide the program to a player, a recording medium that is provided to a player as embedded in the main unit of the apparatus, etc.

In this specification, steps dictated in the program recorded on the recording medium may include not only processing that is executed sequentially in order of time but also processing that is not executed sequentially in order of time but is executed in parallel or individually.

Furthermore, in this specification, the term "system" should be construed to mean an overall apparatus constituted of a plurality of devices, a plurality of means, etc.

In other words, an information processing system according to the present invention may be embodied in various forms configured as follows, including the information processing system according to the above-described embodiment in FIGS. 1 and 4.

Specifically, an information processing system according to the present invention is:

an information processing system including a plurality of terminals (e.g., the player terminals 1-1 to 1-*m* in FIG. 1) that are capable of accepting individual operations by a plurality of players and executing a game and also including a server (e.g., the server 2 in FIG. 1), wherein each of the plurality of terminals includes:

a display control means (e.g., the display control unit 102 in FIG. 4) for executing control so as to display a list including a plurality of symbols as candidate symbols that can be sent to another terminal, the symbols each being associated with a predetermined code and constituted of characters, a graphic, a sign, or a combination of these elements; and a sending control means (e.g., the stamp sending control unit 104 in FIG. 4) for executing control so as to set one of the plurality of candidate symbols, selected by the player, as an item to send and so as to send the code associated with the item to send to another terminal, and wherein the terminal or the server includes:

a management means (e.g., the stamp-metadata management unit 181 in FIG. 4) for managing each of the plurality of candidate symbols in association with metadata indicating a certain situation in the game;

a listing-order control means (e.g., the stamp-display-order determining unit 153 in FIG. 4) for controlling, on the basis of individual correlations between the plurality of metadata individually associated with the plurality of candidate symbols managed by the management means and situation data indicating a current situation in the game being executed, a listing order for displaying the plurality of candidate symbols under the control by the display control means; and an updating means (e.g., the metadata updating unit 154 in FIG. 4) for updating, on the basis of the result of selection of the item to send by the player, the content of the metadata for each of the plurality of candidate symbols managed by the management means.

This makes it possible to establish a function for sending and receiving stamps, etc., which provides a high representation ability and enables quick input via an operation for selecting a stamp, etc. that suits a game situation, as a function for carrying out communication among a plurality of players during the execution of a game.

Specifically, it becomes possible to realize a function for continuously reordering candidate symbols (stamps, etc.) in descending order of usage possibility in accordance with the current game situation changing in real time through dynamic calculation without having to predefine fixed game situations, such as multi-battle situations.

Accordingly, it becomes possible to provide the following four advantages.

A first advantage is that scalability in the number of kinds of stamps is ensured.

Specifically, with the information processing system according to the present invention, even in the case where a large number of kinds of candidate symbols (stamps, etc.) exist, it is possible to preferentially display candidate symbols that suit a current game situation at high ranks in a list.

Therefore, for the player at the terminal, an increase in the number of kinds of stamps does not directly lead to difficulty in selecting an item to send. This allows the game administrator to easily increase the number of kinds of stamps.

Furthermore, with this scalability in the number of kinds of stamps, it becomes possible to realize a business model of selling symbols (stamps, etc.) and to support a service, etc. in which symbols (stamps, etc.) are distributed as rewards in a game.

A second advantage is that it becomes possible to readily support a variety of communications.

With the first advantage, it becomes possible to prepare a number of stamps necessary and sufficient for communication among players in a game. As a result, it becomes possible to use symbols (stamps, etc.), which have hitherto been used only as auxiliary tools with freely input text, as a main communication tool.

A third advantage is the compatibility with fast tempos required in multi-battles.

Specifically, it has not been practically possible to use conventional free-text chat functions during multi-battles since they require time for input.

In contrast, with the information processing system according to the present invention, it is possible to select a symbol (stamp, etc.) just with an operation that can be performed easily and immediately, such as a single tap operation.

Furthermore, it is possible to readily determine a listing order of symbols so that symbols associated with metadata having high correlations with a current game situation, i.e., symbols (stamps, etc.) that suit the current game situation, will be presented so as to be easily recognizable by the player.

As a result, it becomes possible for the player to quickly select a symbol (stamp, etc.) to send to another player, which makes it possible to readily ensure compatibility with a fast tempo of a multi-battle.

A fourth advantage is that it becomes possible to readily support personalization.

Specifically, since the information processing system according to the present invention is based on dynamic calculation, making it possible to update metadata associated with symbols on a per-player basis, personalization is readily allowed.

Therefore, it is possible to recommend different symbols (stamps, etc.) in accordance with differences in preference or deviations in owned characters among individual players.

Furthermore, the listing-order control means may include:

an obtaining means for obtaining the situation data indicating the current situation in the game being executed;

a calculating means (e.g., the score calculating unit 161 in FIG. 4) for calculating individual scores, on the basis of correlations of the situation data with the associated metadata, for the plurality of candidate symbols managed by the management means; and an order determining means (e.g., the order determining unit 162 in FIG. 4) for determining an order for listing the plurality of candidate symbols according to the individual scores of the plurality of candidate symbols managed by the management means.

As described above, scores are calculated on the basis of correlations, and the listing order of the individual candidate symbols is determined on the basis of the scores, which constitute a clearer criterion. Thus, the individual candidate symbols are presented to the player in an order that better suits the current game situation.

Furthermore, the metadata and the situation data may be represented by vectors in a multi-dimensional vector space, and the listing-order control means may calculate, as the correlations, the distances between the vectors for the metadata and the vector for the situation data in the multi-dimensional vector space.

This makes it possible to readily use various attributes relating to the game situation as individual elements constituting the vectors. That is, it is possible to readily generate appropriate vectors for a game title, etc.

Accordingly, since appropriate correlations are calculated through calculation that is appropriate for a game title, etc., the individual candidate symbols are presented to the player in an order that better suits the current game situation.

Furthermore, items to be displayed under the control by the display control means may include a first symbol group to which one or more of the candidate symbols whose listing order is variable belong and also include a second symbol group to which one or more of the candidate symbols whose listing order is fixed belong, and the listing-order control means may control the listing order of the one or more candidate symbols belonging to the first symbol group on the basis of individual correlations between the plurality of metadata individually associated with the one or more candidate symbols belonging to the first symbol group and the situation data indicating the current situation in the game being executed.

This makes it possible to readily display both a conventional static list including the second symbol group and a dynamic list including the first symbol group according to the present invention, which will be convenient for the player.

The management means may manage certain ones of the candidate symbols in association with the metadata representing initial values associated in advance (e.g., the metadata stored in the initial-value DB 173 in FIG. 4) and the metadata representing content updated by the updating means (e.g., the metadata stored in the per-player DB 172 in FIG. 4), and the listing-order control means may selectively use the metadata representing initial values or the metadata representing updated content in controlling the listing order of the certain candidate symbols.

This makes it possible to selectively use the initial-value metadata and the metadata personalized for each player for a single symbol (stamp, etc.) by switching between these kinds of metadata. Therefore, it is possible to present a symbol group whose listing order is changed from various viewpoints to the player.

REFERENCE SIGNS LIST 1, 1-1 to 1-*m*, 1-P, 1-Q Player terminal
2 Server
21, 51 CPU
101 Command issuing unit
102 Display control unit
103 Sent-stamp accepting unit
104 Stamp sending control unit
105 Update/no-update determining unit
111 Stamp display control unit
112 Game-screen display control unit
151 Game-situation management unit
152 Situation-data obtaining unit
153 Stamp-display-order determining unit
154 Metadata updating unit
155 Initial-metadata creating unit
161 Score calculating unit
162 Order determining unit
171 Stamp DB
172 Per-player DB
173 Initial-value DB
174 Game-situation DB
181 Stamp-metadata management unit

The invention claimed is:

1. An information processing system comprising a plurality of terminals that are capable of accepting individual operations by a plurality of players and executing a game and also comprising a server, wherein a terminal of the plurality of terminals includes a first processor coupled to a first memory, and a display, wherein the server includes a second processor coupled to a second memory, wherein the terminal is configured to:

execute control so as to display a list including a plurality of symbols that can be sent to another terminal, each symbol among the plurality of symbols being associated with a predetermined code and constituted of characters, a graphic, a sign, or a combination thereof on the display; and execute control so as to set one of the plurality of symbols, selected by the player, as an item to send and so as to send the code associated with the item to send to the another terminal, and wherein the terminal or the server is configured to:

manage each symbol of the plurality of symbols in association with game situation data indicating a certain situation in the game, wherein the plurality of symbols are made to correspond to symbol metadata;

control a listing-order of a plurality of candidate symbols to be displayed on the display from among the plurality of symbols based on a current situation in the game based on individual correlations between the game situation data and the symbol metadata; and update the symbol metadata that is managed by the terminal or the server based on a result of a selection of the item to send by the player.

2. The information processing system according to claim 1, wherein controlling the listing-order of the plurality of candidate symbols comprises:

obtaining the game situation data indicating the current situation in the game being executed;

calculating individual scores, on the basis of correlations of the game situation data with the associated symbol metadata, for the plurality of candidate symbols; and determining an order for listing the plurality of candidate symbols according to the individual scores of the plurality of candidate symbols.

3. The information processing system according to claim 2, wherein the symbol metadata and the game situation data are represented by vectors in a multi-dimensional vector space, and wherein controlling the listing-order of the plurality of candidate symbol comprises calculating, as the correlations, distances between the vectors for the symbol metadata and the vector for the game situation data in the multi-dimensional vector space.

4. The information processing system according to claim 1, wherein items to be displayed by the display include a first symbol group to which one or more of the plurality of candidate symbols whose listing order is variable belong and also include a second symbol group to which the one or more of the plurality of candidate symbols whose listing order is fixed belong, and wherein the server or the terminal is configured to control the listing order of the one or more of the plurality of candidate symbols belonging to the first symbol group on the basis of individual correlations between the plurality of symbol metadata individually associated with the one or more candidate symbols belonging to the first symbol group and the game situation data indicating the current situation in the game being executed.

5. The information processing system according to claim 1, wherein the terminal or the server is configured to manage the candidate symbol in association with the symbol metadata representing an initial value associated in advance and the symbol metadata representing content updated by the updating means, and wherein the terminal or the server is configured to selectively use the symbol metadata representing the initial value or the symbol metadata representing updated content in controlling the listing order of the certain candidate symbols.

6. A non-transitory computer readable medium storing a program for computers that control an information processing system including a plurality of terminals that are capable of accepting individual operations by a plurality of players and executing a game and also including a server, the program causing the computer that controls each of the plurality of terminals to execute control processing comprising functionality for:

displaying a list including a plurality of symbols that can be sent to another terminal each being associated with a predetermined code and constituted of characters, a graphic, a sign, or a combination thereof on the display; and setting one of the plurality of symbols, selected by the player, as an item to send and so as to send the code associated with the item to send to the another terminal, and the program causing the computer that controls the terminal or the server to execute control processing comprising functionality for:

managing each symbol of the plurality of symbols in association with game situation data indicating a certain situation in the game, wherein the plurality of symbols are made to correspond to symbol metadata;

controlling a listing-order of a plurality of candidate symbols to be displayed on the display from among the plurality of symbols based on a current situation in the game based on individual correlations between the game situation data and the symbol metadata; and updating the symbol metadata based on a result of a selection of the item to send by the player.

7. A server that carries out communication with a plurality of terminals that are capable of accepting individual operations by a plurality of players and executing a game, wherein a terminal of the plurality of terminals includes a first processor coupled to a first memory, and a display, wherein the server includes a second processor coupled to a second memory, wherein, in the case where each of the plurality of terminals executes control so as to display a list including a plurality of symbols that can be sent to another terminal, each being associated with a predetermined code and constituted of characters, a graphic, a sign, or a combination thereof on the display, so as to set one of the plurality of candidate symbols, selected by the player, as an item to send, and so as to send the code associated with the item to send to the another terminal, wherein the server is configured to:

manage each symbol of the plurality of symbols in association with game situation data indicating a certain situation in the game, wherein the plurality of symbols are made to correspond to symbol metadata;

control a listing-order of a plurality of candidate symbols to be displayed on the display from among the plurality of symbols based on a current situation in the game based on individual correlations between the game situation data and the symbol metadata; and update the symbol metadata that is managed by the terminal or the server based on a result of a selection of the item to send by the player.

* * * * *